H. A. WRIGHT.
VALVE GRINDER.
APPLICATION FILED JULY 28, 1919.
1,418,419.
Patented June 6, 1922.
2 SHEETS—SHEET 1.
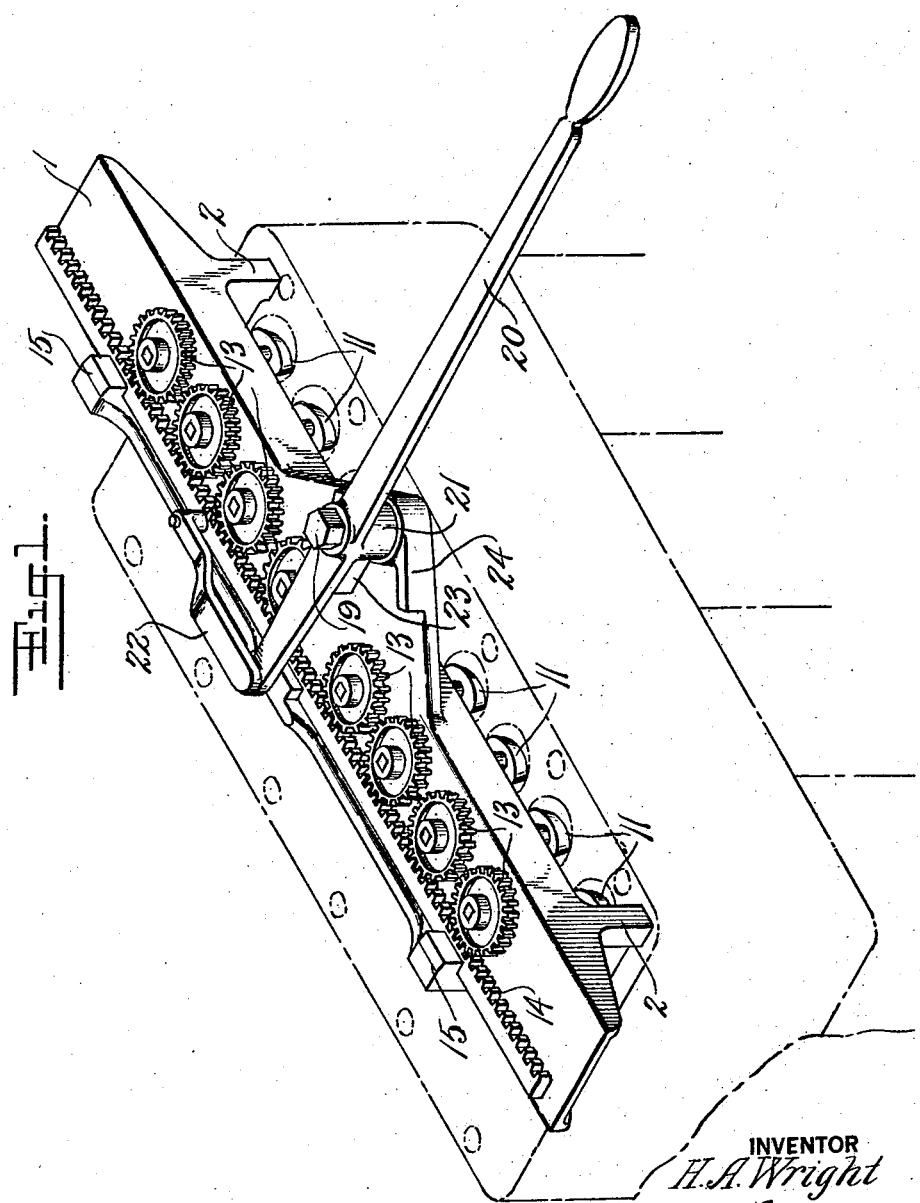
INVENTOR
H. A. Wright
BY
his ATTORNEYS

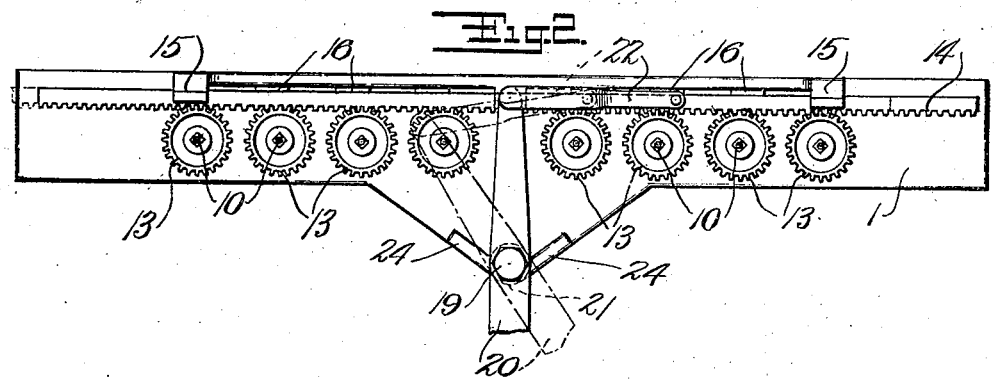
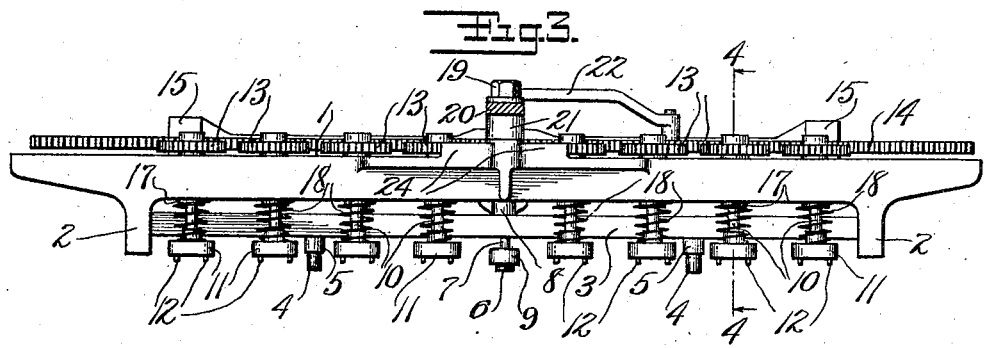
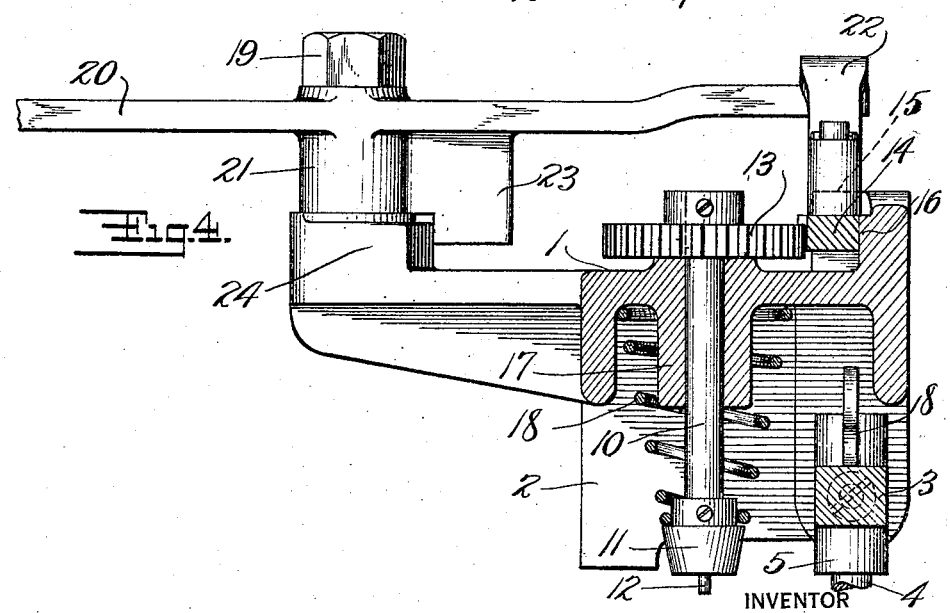

UNITED STATES PATENT OFFICE.

HARRY A. WRIGHT, OF SPRINGFIELD, MASSACHUSETTS, ASSIGNOR TO THE WRIGHT MULTIPLE VALVE GRINDER CO., OF FITCHBURG, MASSACHUSETTS.

VALVE GRINDER.

1,418,419.  Specification of Letters Patent.  Patented June 6, 1922.

Application filed July 28, 1919. Serial No. 313,774.

*To all whom it may concern:*

Be it known that I, HARRY A. WRIGHT, a citizen of the United States, residing at Springfield, county of Hampden, State of Massachusetts, have invented a certain new and useful Improvement in Valve Grinders, of which the following is a full, clear, and exact description.

My invention relates to improvements in valve grinders, particularly to a multiple grinder having a series of valve oscillating spindles carried by a frame pivoted to a securing bar and actuated by a single rack which is reciprocated by a lever moving in a plane at right angles to the axes of the spindles, as described in my application Serial No. 283,845 filed March 20, 1919. One of the objects of my invention is to provide means for protecting the ends of the rack bar so that they will not be liable to be damaged when the grinder is being carried or being shipped. Another object is to provide a new and improved means for securing the grinder in the cylinder block of an engine. Another object is to provide a grinder having springs for holding the valve oscillating elements yieldingly in downward position, the length of said springs being independent of the length of the bearings for said elements and permitting the throwing out of action of any one element. Another object is to provide a simple bearing for said rack bar integral with the supporting frame.

The following is a description of an embodiment of my invention particularly adapted for grinding the valves of a "Ford" car, reference being had to the accompanying drawings, in which, Fig. 1 shows a perspective of my improved valve grinder applied to the engine block of an internal combustion engine;

Fig. 2 is a plan view of my grinder;

Fig. 3 is a front elevation of the same; and

Fig. 4 is an enlarged section on the line 4—4, Fig. 3.

Referring more particularly to the drawings, 1 is a cast iron support having adjacent to its ends legs 2—2. 3 is a securing bar pivotally connected to the rear portions of the legs 2—2 so as to support those rear portions while permitting the front portions to rest upon the top of the cylinder block. This securing bar 3—3 is provided with dowel pins 4 having shoulders 5. These dowel pins are adapted to extend into bolt-holes in the cylinder block, which bolt-holes are ordinarily filled by the bolts for securing the cap of the engine to the cylinder block. When the dowel pins are within these bolt-holes, the shoulders 5 rest upon the top of the cylinder block so as to space the bar 3 away therefrom. 6 is a screw plug having a reduced shank 7 and a thumb-piece 8 rigidly secured to the shank, the shank 7 passing through a hole in the bar 3. 9 is a cap spacer loosely surrounding the shank 7 and adapted to fill the space between the bar 3 and the engine block when the dowel pins 4 are within their bolt-holes, the screw-threaded portion 6 being screwed into another bolt-hole and thereby securing the bar 3 in fixed position with reference to the cylinder block. This cap spacer permits the screw 9 to move upward toward the bar 3 further than a plain washer would permit it to do and yet performs a proper spacing function when desired. Mounted in the main support 1 are eight spindles 10 forming portions of the valve oscillating elements, said spindles being provided on their lower ends with heads 11 carrying pins 12 for engaging the valves. These spindles are also provided with gears 13 which are engaged by a reciprocating rack 14 carried by the portion 1 moving in guides formed beneath lugs 15 cast integral with the said portion 1. The back of the rack is guided by the bottom of the grooves in lugs 15 and also by projections 16 substantially in line with several spindles 13 so as to provide thrust bearings at these points. By having this supporting surface discontinuous as shown, the direct thrust of the gears upon the racks is balanced and yet the surfaces necessary to be machined in order to provide a proper way for the rack are largely reduced.

As shown in Figs. 3 and 4, the main support 1 has a plurality of downwardly extending bosses 17 which are surrounded by conical springs 18 whose upper ends bear against the under side of the main portion of the support 1 and whose lower ends bear against the portions 11 on the spindles 13, thus holding the spindles yieldingly in downward position with the gears 13 in mesh with the rack 14. By this means an elongated bearing for each valve oscillating element is obtained without interfering with the length of the springs 18. The springs 18 therefore permit the valve oscillating elements to be raised sufficiently to disengage the gears 13 from the rack 14 if desired, in which position they can be blocked up so as to discontinue the grinding of any one valve while continuing the grinding of the remaining valves.

The main support 1 has ends 19 projecting beyond the legs 2 so that the total length of the main support 1 is slightly greater than the length of the rack 14, thereby protecting the same when the device is being shipped or handled, since if the ends of the rack were exposed they would be liable to be hit and bent. The rack 14 is oscillated by a lever 20 pivoted at 21 and connected to the rack by a link 22. This lever is provided with a downward projection 23, which, at the limit of its throw, engages stop surfaces 24 formed upon the main portion so as to limit the extent of movement. The space between the lever 20 and the upper end of the spindles 13 is such that these spindles can be raised so as to disengage their gears from the rack 14 without interfering with the movement of the lever 20.

In use, my valve grinder is operated as follows:

The bar 3 of the grinder is secured to the cylinder block of an engine as shown in Fig. 1 by means of the thumb-screw 6, the dowels 4 extending into corresponding bolt-holes, with the forward portions of the leg 2 resting upon the cylinder plug. This brings the spindles over the eight valves of the engine and upon the oscillation of the handle 20 the pins 12 engage their respective valves so as to oscillate them as the rack 14 is reciprocated. The frame 1 is held in its downward position by a slight pressure upon the end of the handle 20 and when it is desired to inspect the valves the frame 1 is tipped upward by the handle 20 so as to remove the valve oscillating elements from the valves. This permits inspection of all the valves and if any of them appear to be sufficiently ground the valve oscillating element corresponding to that valve can be lifted against its spring so as to be free from the rack 13 and held in that lifted position by any suitable block, whereupon the frame 1 can be restored to its normal position and the grinding of the other valves continued. The valves are of course temporarily supplied with the ordinary lifting springs used in valve grinding, the springs 18 being sufficiently strong to overcome the action of such lifting springs when the frame 1 is in normal position.

As will be evident to those skilled in the art, my invention permits of various modifications without departing from the spirit thereof or the scope of the appended claims.

What I claim is:

1. In a valve grinder comprising a securing bar, a support pivoted thereto, a plurality of geared valve oscillating elements having spindles journaled in said support, a rack for operating said spindles, a lever fulcrumed on said support and movable in a plane at right angles to the axes of said spindles for operating said rack, the improvement consisting of a plurality of bosses projecting downwardly from the lowermost side of said support and integral therewith, said bosses and support having holes forming bearings therein for said spindles and springs surrounding said bosses, each having one end engaging said frame at the base of its boss and its other end in engagement with the lower portion of its valve oscillating element.

2. In a valve grinder comprising a securing bar for securing the grinder to the engine casing, a support pivoted thereto so as to turn about a horizontal axis, a plurality of geared valve oscillating elements having normally vertical spindles journaled in said support, a rack parallel to said axis for operating said spindles, a lever fulcrumed on said support and movable in a plane at right angles to the axes of said spindles for operating said rack, said support being as long as said rack and said legs being removed a substantial distance from the ends of the support and resting on the top of the engine casing in proximity to the ends of the casing.

3. In a valve grinder, comprising a securing bar, a support pivoted thereto, a plurality of valve oscillating elements having spindles journaled in said support, a rack for operating said spindles, a lever fulcrumed on said support and movable in a plane at right angles to the axes of said spindles for operating said rack, a plurality of bosses projecting downwardly from the lower side of said frame having holes forming bearings therein for said spindles and coiled springs surrounding said bosses, each spring having one end engaging said frame at the base of its boss and its other end in engagement with the lower portion of its valve oscillating element, the improvement which consists in said lever being spaced above said gears a distance greater than the distance between the upper surface of said rack and the lower surface of said gears, and said spindles having exposed portions at least as long as said distance so as to permit the gears to be raised sufficiently to disengage said rack below said bosses.

4. A valve grinder having, in combination, a support capable of being mounted on the engine casing, a plurality of valve oscillating elements having spindles extending through and journaled in said support, springs acting on the spindles for urging the oscillating elements toward the valves, means for operating the oscillating elements comprising gears secured to the upper ends of the spindles and a rack engaging the gears, said spindles capable of being independently raised against the tension of their springs to position the gears out of engagement with the rack, and means comprising a lever for operating said rack movable in a plane at right angles to the axes of said spindles and spaced above the upper ends of the spindles a sufficient distance to enable said lever to be operated after any one of said spindles has been raised to disengage its gear from said rack.

HARRY A. WRIGHT.